(12) United States Patent
Patel et al.

(10) Patent No.: US 8,370,097 B2
(45) Date of Patent: Feb. 5, 2013

(54) CALIBRATION TECHNIQUES FOR AN ELECTRONIC COMPASS IN PORTABLE DEVICE

(75) Inventors: Parin Patel, San Francisco, CA (US); Ronald K. Huang, Milpitas, CA (US); Patrick S. Piemonte, San Francisco, CA (US); Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 377 days.

(21) Appl. No.: 12/479,182

(22) Filed: Jun. 5, 2009

(65) Prior Publication Data
US 2010/0312509 A1    Dec. 9, 2010

(51) Int. Cl.
*G01C 17/38* (2006.01)
(52) U.S. Cl. ............................. 702/92; 702/153
(58) Field of Classification Search .......... 702/92–94, 702/151, 153, 154; 33/356, 357, 324, 326
See application file for complete search history.

(56) References Cited

U.S. PATENT DOCUMENTS

| | | | |
|---|---|---|---|
| 4,414,753 A | 11/1983 | Moulin et al. | |
| 5,117,375 A | 5/1992 | Worcester et al. | |
| 6,083,353 A * | 7/2000 | Alexander, Jr. | 202/158 |
| 6,349,263 B1 | 2/2002 | Green et al. | |
| 6,836,971 B1 | 1/2005 | Wan | |
| 6,871,411 B1 | 3/2005 | Kang et al. | |
| 6,877,237 B1 | 4/2005 | Withanawasam | |
| 7,451,549 B1 | 11/2008 | Sodhi et al. | |
| 2006/0032064 A1 * | 2/2006 | Sato et al. | 33/356 |
| 2006/0066295 A1 | 3/2006 | Tamura et al. | |
| 2006/0122800 A1 | 6/2006 | Haverkamp et al. | |
| 2009/0254294 A1 | 10/2009 | Dutta | |
| 2009/0271109 A1 * | 10/2009 | Lee et al. | 701/208 |

FOREIGN PATENT DOCUMENTS

| | | |
|---|---|---|
| EP | 1605232 A2 | 12/2005 |
| EP | 1832889 A2 | 9/2007 |
| WO | WO-9848292 | 10/1998 |
| WO | WO-0246695 A2 | 6/2002 |

OTHER PUBLICATIONS

"2-Axis Compass with Algorithms HMC6352", Product specification, Honeywell, Plymouth, MN, Jan. 2006, Internet download at: www.honeywell.com, [13 pages]. PCT International Search Report and Written Opinion (dated Jul. 23, 2010), International Application No. PCT/US2010/033774,International Filing Date—May 5, 2010, (17 pages).
PCT International Preliminary Report on Patentability (dated Dec. 15, 2011), International Application No. PCT/US2010/033774, International Filing Date—May 5, 2010, (11 pages).
International Preliminary Report on Patentability mailed Dec. 15, 2011 for PCT/US2010/033774 filed May 5, 2010.

* cited by examiner

*Primary Examiner* — Manuel L Barbee
(74) *Attorney, Agent, or Firm* — Blakely, Sokoloff, Taylor & Zafman LLP

(57) ABSTRACT

Measurement data is collected from a magnetic sensor in a portable device, while the device is being carried by its end user and without requiring the end user to deliberately rotate or position the device while the output data is being collected. For example, the device may be held in the user's hand while walking or standing, or it may be fixed to the dashboard of an automobile or boat. Measurement data may also be collected from one or more positing, orientation or movement sensors. The collected measurement data from one or both of the magnetic sensor and the position, orientation or movement sensor is processed. In response, either a 2D compass calibration process or a 3D process is signaled to be performed. Other embodiments are also described and claimed.

23 Claims, 5 Drawing Sheets

CALIBRATION TECHNIQUES FOR AN ELECTRONIC COMPASS IN PORTABLE DEVICE

An embodiment of the invention is related to techniques for calculating and removing the contribution of an interfering, local offset magnetic field from the output of a 3-axis magnetic sensor so as to obtain an accurate reading of the Earth's geomagnetic field. Other embodiments are also described.

BACKGROUND

A portable device such as a cellular phone or a smart phone can now be equipped with an electronic compass. The compass calculates and provides its user with a direction, which may be a "heading" (typically given relative to the Earth's magnetic field), and/or an arrow pointing to true north. The direction information may be provided for the user's own navigation knowledge, for example, to tell him which way is north while he is walking or driving in unfamiliar surroundings. The direction information is also beneficial for use by a navigation or map application that may be running in the device.

The electronic compass obtains a measure of the magnetic field that is present in its immediate surrounding as a three-component (e.g., in x, y, and z directions) vector, using a 3-axis magnetic sensor. The sensed field contains a contribution by the Earth's magnetic field, and a contribution by a so-called local interference field. The latter is the magnetic field that is created by components in the local environment of the portable device. This may include contributions by any magnetic component that is near the sensor, such as a loudspeaker that is built into the device. The interference field may also have a contribution due to magnetic elements found in the external environment close to the device, such as when the user is driving an automobile, riding in a train or bus, or riding on a bicycle or motorcycle.

In most cases, the interference field is not negligible relative to the Earth field. Therefore, a calibration procedure is needed to remove the, interference field contribution from the sensor's measurements, in order to allow the compass to calculate the correct direction at that moment. There are several types of 3-axis calibration procedures. In one such technique, the user is instructed to rotate the device (containing the compass) according to a set of geometrically different orientations and azimuth angles, while measurements by the compass and by an orientation sensor are collected and analyzed so as to isolate or solve for the interference field. The solved interference field is then subtracted from a measurement taken by the magnetic sensor, to yield the geomagnetic field (which may then be further corrected into the true north direction).

In another 3-axis calibration technique, rather than instruct the user to deliberately rotate the device in a predetermined manner, many measurements are collected from the compass, continuously over a period of time, while the device is being used or carried by the user in the usual course. This typically leads to random albeit sufficient rotations of the device, such that the compass measurements define a desired, generally spherical measurement space. The sphere is offset from the origin of a coordinate system for the geomagnetic field vector, by an unknown offset vector, which represents a substantial part (if not all) of the interference field. Mathematical processing of the measurements is then performed to re-center the sphere, i.e. solve for the offset vector. Thus, this technique is desirably transparent to the user because the user is not required to go through a procedure where he must deliberately rotate the device through a specified set of orientations.

SUMMARY

In order to provide good accuracy, a 3-axis calibration technique needs to collect a sufficient number of well-distributed measurement points from the magnetic sensor (to define the required spherical measurement space). Such data, however, are not always available, even for a portable device that can easily be rotated by its user to generate those measurement points. For example, consider the case where the user is driving a car and has docked or fixed his portable device to the dashboard of the car. The device (including its compass) in that case remains level, i.e. it hardly tilts much or rotates about the horizontal plane. This means the magnetic sensor does not produce the needed measurement points for a typical 3-axis sensor calibration procedure, so that the "transparent" calibration procedure described above will no longer give an accurate direction reading.

In accordance with an embodiment of the invention, a portable device having a compass function that uses a three axis magnetic sensor has at least two compass calibrators. Each calibrator computes the geomagnetic field using measurements made by the sensor, based on its interpretation of the offset field. A first calibrator (also referred to as a three dimension, 3D, calibrator) computes its offset field based on a set of magnetic field measurements made by the sensor that define a generally spherical surface. Such sensor measurements are available when the device is undergoing sufficient rotations about the horizontal plane.

A second calibrator (referred to as a two dimension, 2D, calibrator) computes its offset field based on a set of magnetic field measurements (made by the sensor) that define a generally circular path. Such measurements are available when, for example, the device is moving in the horizontal plane but remains essentially level while doing so.

A compass direction output module selects which of the two calibrators to use for providing its direction output. The selection may depend upon how the portable device is being carried by its user. For example, the device may be designed to automatically infer that it has been attached or fixed to the dashboard of a car, such that the 3D calibrator should be set aside in favor of the 2D calibrator. Thereafter, when the device determines that it has returned to a "3D mode of use", responsibility for providing the output direction is entrusted to the 3D calibrator.

In accordance with yet another embodiment of the invention, an estimate of the accuracy of the compass direction output is computed; if the accuracy has improved, then such an indication is provided to the user. For instance, if an updated direction output that is based on the 2D calibrator is estimated to yield a more accurate result than one based on the 3D calibrator, then a user interface module of the portable device is signaled to inform the user of improved compass accuracy. The accuracy indication may include an estimated error bound (e.g., in degrees) for the updated direction output.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

A compass indicates a direction, either a heading or an arrow pointing to true north. An electronic compass has a magnetic sensor also referred to as a magnetometer that cannot tell the difference between the geomagnetic field and the local interference field. A calibration procedure is thus used to find and remove the interference field, so as to determine the geomagnetic field. In accordance with the embodiments of the invention described below, a 3-axis compass is equipped with several different types of calibration procedures, to improve the likelihood of compass accuracy in a variety of different usage modes or user contexts.

Figure 1:
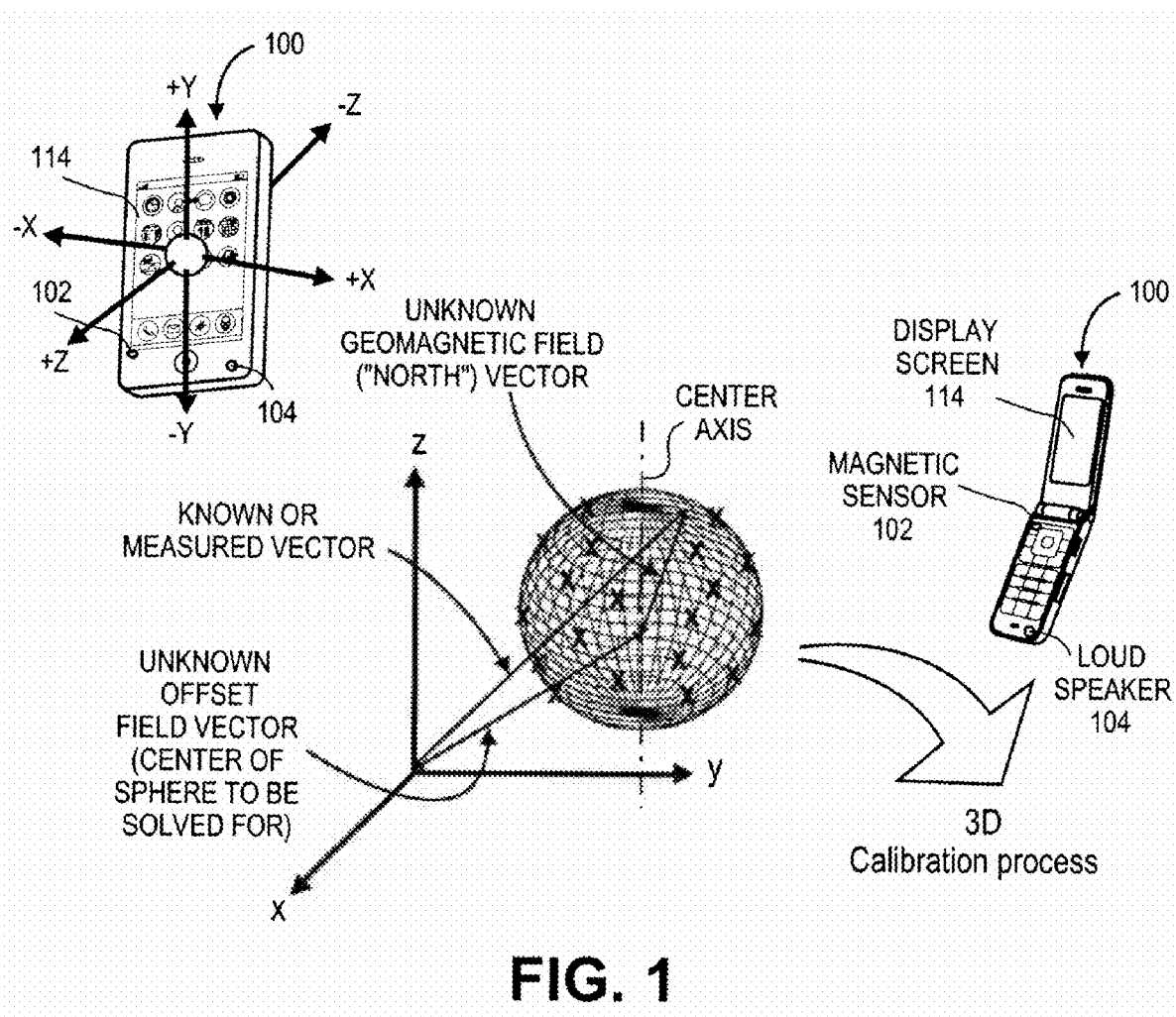
FIG. 1 is a diagram of a magnetic measurement space that appears in an example 3D calibration process for an electronic compass in a portable device.

Beginning with FIG. 1, this is a diagram of a magnetic measurement space that would be produced by a 3-axis magnetic sensor 102 in a portable device 100. Note that the device 100 depicted in the drawings is a smart phone containing a loudspeaker 104, the latter being an example component that contributes substantially to the interference field. However, the compass calibration techniques described here are also applicable to other types of portable devices that have a built-in compass, such as a dedicated navigation device.

Figure 4:
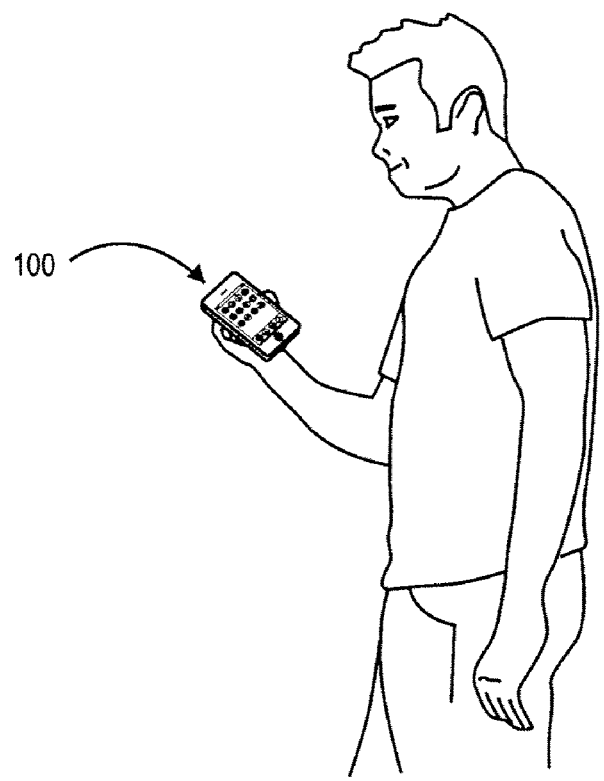
FIG. 4 shows an example 3D mode of use wherein the portable device is being held in its user's hand.

In FIG. 1, the measurement space is one that can be produced during a 3D compass calibration process, where the device 100 is undergoing sufficient tilting or rotation about the horizontal or x-y plane (while the sensor 102 collects data points for calibration). FIG. 4 shows an example 3D mode of use wherein the portable device is being held in its user's hand. As shown in the diagram of FIG. 1, each data point may be a magnetic field vector whose corresponding endpoint in the 3D coordinate space is the sum of an unknown offset field and the geomagnetic field (also an unknown). In several user contexts, the components that contribute most to the offset field can be viewed as being fixed to the portable device, such that they move together with the magnetic sensor 102 as one. In other words, as the portable device 100 is rotated about an axis, the offset field rotates and moves in the same way. This is contrast to the geomagnetic field, which remains stationary while the device 100 is rotated or moved about the horizontal plane. Viewed another way, from the standpoint of the sensor 102, as its coordinate system rotates, the direction of the geomagnetic field in that coordinate system changes but the offset field remains the same. The result of this relationship between the geomagnetic field and the offset field is that the magnetic sensor 102 produces a locus of measurements or data points that define or lie on generally a sphere, as shown.

It should be noted that the references here to "generally a sphere" are meant as a convenience, understood to include not just a perfect sphere but also a distorted one such as an ellipsoid. That is because the interference effect could be modeled as having two components: an additive offset vector that may be essentially constant; and a scaling factor applied to the geomagnetic field vector that changes with direction (thereby resulting in a slightly distorted measurement surface, rather than a perfectly spherical one). Other ways of modeling the local magnetic interference effect are possible.

Still referring to FIG. 1, it can be seen that as the portable device 100, and hence its integrated magnetic sensor 102, is rotated about the x, y and z axes, the sensor's sampled output changes thereby creating the locus of points that define a generally spherical surface. Note also that the sphere is offset from the origin of the coordinate system, in accordance with the offset field. As explained above, in many instances this offset field may be assumed to be constant (as the portable device rotates about an axis).

Thus, it becomes clear that to calibrate the compass, the unknown offset field needs to be determined or solved for. Once that is done, the geomagnetic field vector can be obtained, by subtracting the solved for offset vector from a measurement vector that is output by the sensor 102. Known, computer implemented mathematical estimation techniques such as the Least Squares Method may be applied to a set of sensor-measured vectors (referred to as a calibration buffer) in order to find the center of the sphere. This may be the vector or point in 3D space that minimizes the variation amongst a sufficient number of instances of the calculated geomagnetic field, which is estimated to be the difference between a measured vector and a postulated offset vector, for a sufficiently large number of different instances of the measured vector. Once the center of the measurement sphere has been solved for in this manner, the 3D calibration process then computes a new geomagnetic vector, based on subtracting the computed offset field vector from the next measurement vector generated by the magnetic sensor 102.

Figure 2:
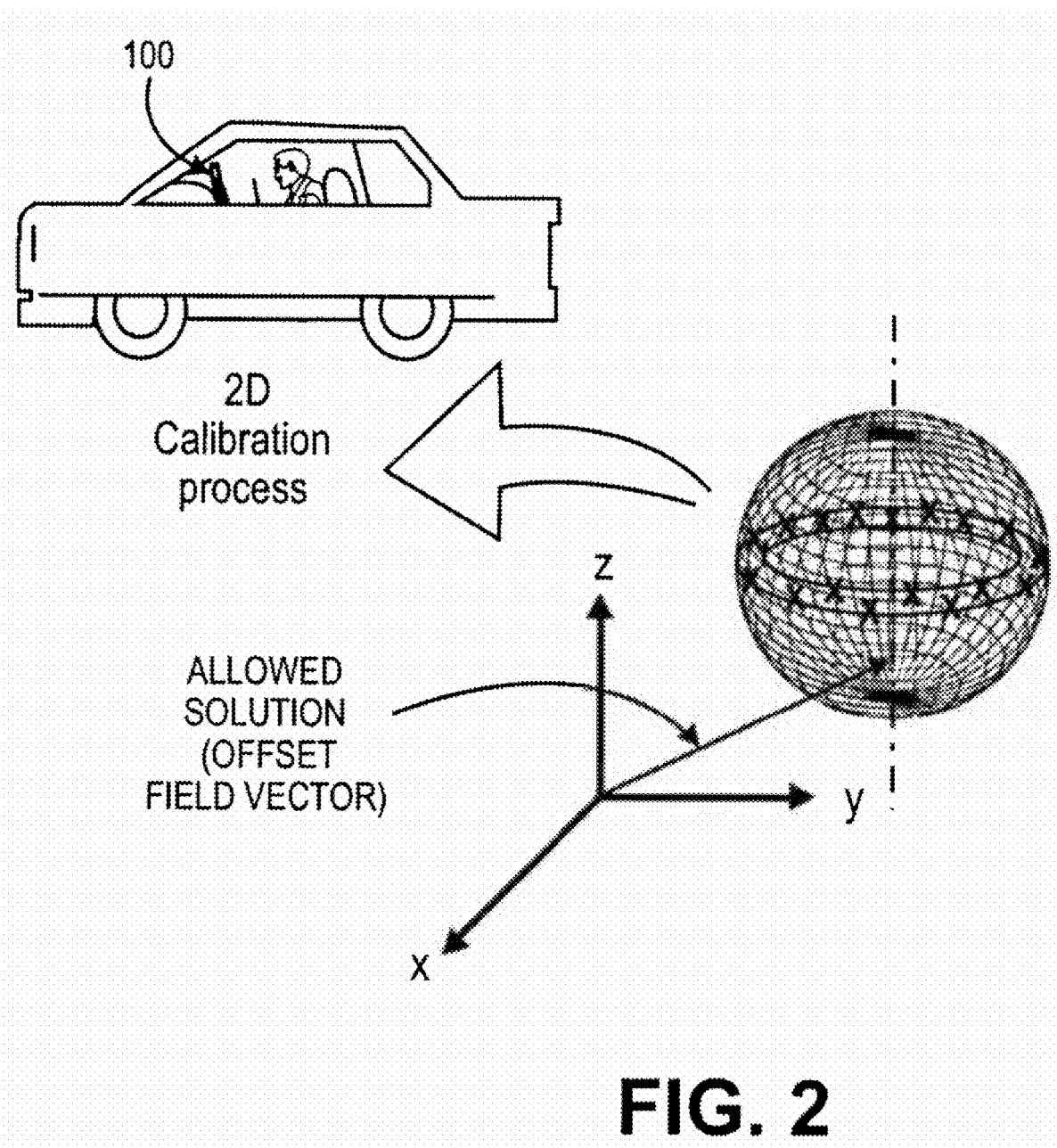
FIG. 2 is a diagram of a magnetic measurement space that appears in an example 2D calibration process.

The 3D calibration process requires a well-distributed set of measurement points on the geomagnetic sphere, namely a set of measurement points that are sufficient to allow the mathematical estimation algorithms to quickly and accurately solve for the center of the sphere. As was suggested above, such data are not always available even for a portable device that can be easily rotated. In particular, FIG. 2 shows the case where the user is driving a car and has docked or fixed his portable device 100 to, for instance, the dashboard of the car. While the device moves with the car, the compass remains level in that it hardly tilts much or rotates about the horizontal plane under normal driving conditions. This means the magnetic sensor 102 does not produce the needed data points for a typical 3D calibration process, such that the transparent or automatic 3D calibration procedure will no longer give an accurate direction. Under those circumstances, a 2D calibration process may be invoked instead of the 3D process, as described below.

Figure 3:
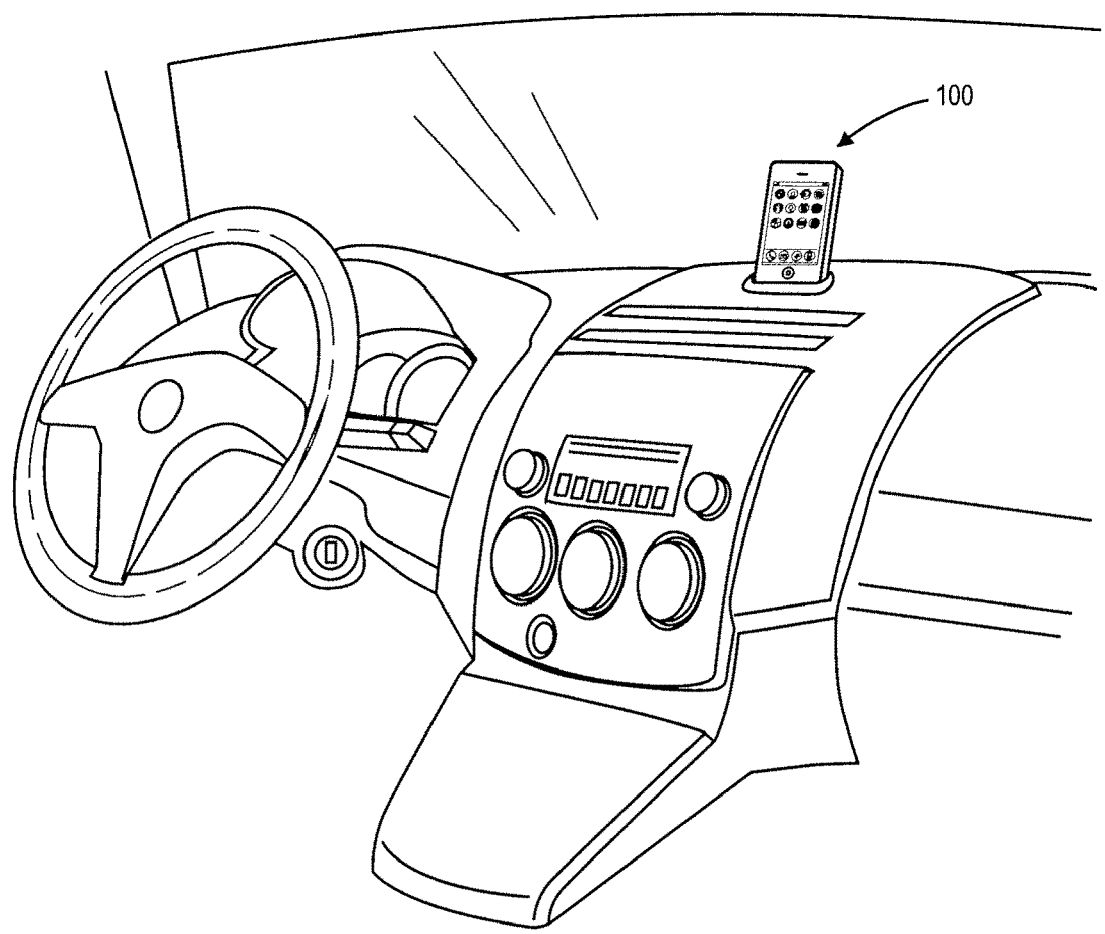
FIG. 3 depicts an example 2D mode of use where the portable device has been fixed to the dashboard of a car that is being driven.
Figure 5:
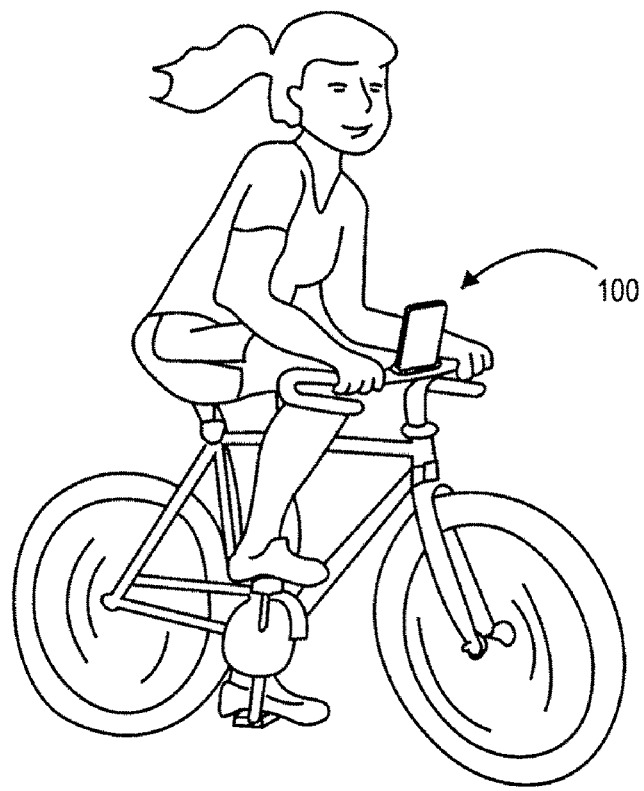
FIG. 5 shows another possible 2D mode of use where the user is riding a bicycle to which she has fixed the portable device.

As shown in the diagram of FIG. 2, the magnetic measurement space that is sought by a 2D calibration process (shown as data points on the surface of the geomagnetic measurement sphere) may generally be a circular path. In other words, as the device 100 rotates albeit slowly around the z axis due to the car being driven around under normal conditions, the magnetic sensor 102 also rotates slowly about the z axis thereby producing a circular path in the x-y or horizontal plane (rather than an entire sphere). All of the data points lie on the circular path because the sensor 102 remains essentially level and does not tilt or rotate sufficiently about the horizontal plane. FIG. 3 and FIG. 5 show further examples of 2D modes of use where the portable device remains essentially level while moving about the horizontal plane, namely by being fixed to the dashboard of a car that is being driven or by being fixed to a handlebar of a bicycle that is being ridden by the user. Other scenarios for 2D mode use include, for example, when the user has fixed the device to the dashboard of a sailing boat.

Note that FIGS. 3 and 5 show situations where the portable device 100 is held in a portrait orientation, where a heading vector computed by the compass would lie in the x z plane of the magnetic sensor (see FIG. 1). However, the techniques described here are also applicable to other orientations, such as flat-face-up (where the heading vector would lie in the x y plane).

Returning to FIG. 2, in the 2D calibration process, the magnetic field measurements made by the sensor 102 are presumed to define or be best fitted by a generally circular path. Note that the reference to "generally circular path" here is intended as a convenience, being understood to include not just a perfect circle, but also a distorted one such as an ellipse. As explained above, this may be due to the interference effect having a contribution from certain types of magnetic materials whose effect can be modeled by a scaling factor that changes with direction (thereby resulting in the distorted path, rather than a perfectly circular one). Other ways of modeling the local magnetic interference effect for the purposes of 2D calibration are possible.

The 2D calibration process may be viewed as being less restrictive than the 3D process, because it may be designed to accept essentially any solution for the offset field vector that lies along the center axis of the sphere. In other words, rather than requiring that the solved for offset vector be the one that points to the center of a sphere, the 2D process allows solutions that point to essentially anywhere along the center axis. Any of those solutions would likely give the correct direction output. The 2D calibration may be a simpler and less compute intensive process than 3D, while still providing an accurate direction output. Also, a 2D solution may be presumed to remain accurate so long as the sensor 102 is essentially staying in the same, single plane (e.g., while moving about the horizontal plane and rotating only about the z axis). The 2D calibration process may be a modified version of a 3D process, where the Least Squares Method now has fewer restrictions for the allowed solution (offset vector).

An additional modification that may be done to a typical 3D calibration process is to lower the rate at which the magnetic sensor output is sampled, so as to improve differentiation between data points along the circular path. As suggested above, in a typical 2D mode use such as while driving a car under normal driving conditions, the portable device rotates relatively slowly around the z axis. Lowering the sampling rate thus improves differentiation of the data points along the circular path, by waiting longer between samples so as to give the portable device more time to rotate about the z axis. Lowering the sampling rate in this manner also helps reduce the likelihood of overflowing the calibration buffer with too many data points, particularly in situations where typical turns while driving are performed relatively slowly and infrequently.

An additional modification that may be made to a typical 3D process in order to achieve 2D calibration is to remove certain aspects or types of validation procedures. A typical 3D calibration process contains at least one type of validation procedure that checks the likelihood of a given solution (offset vector) being sufficiently accurate for providing the output direction of the compass. These procedures my be simplified for the 2D process.

Figure 6:
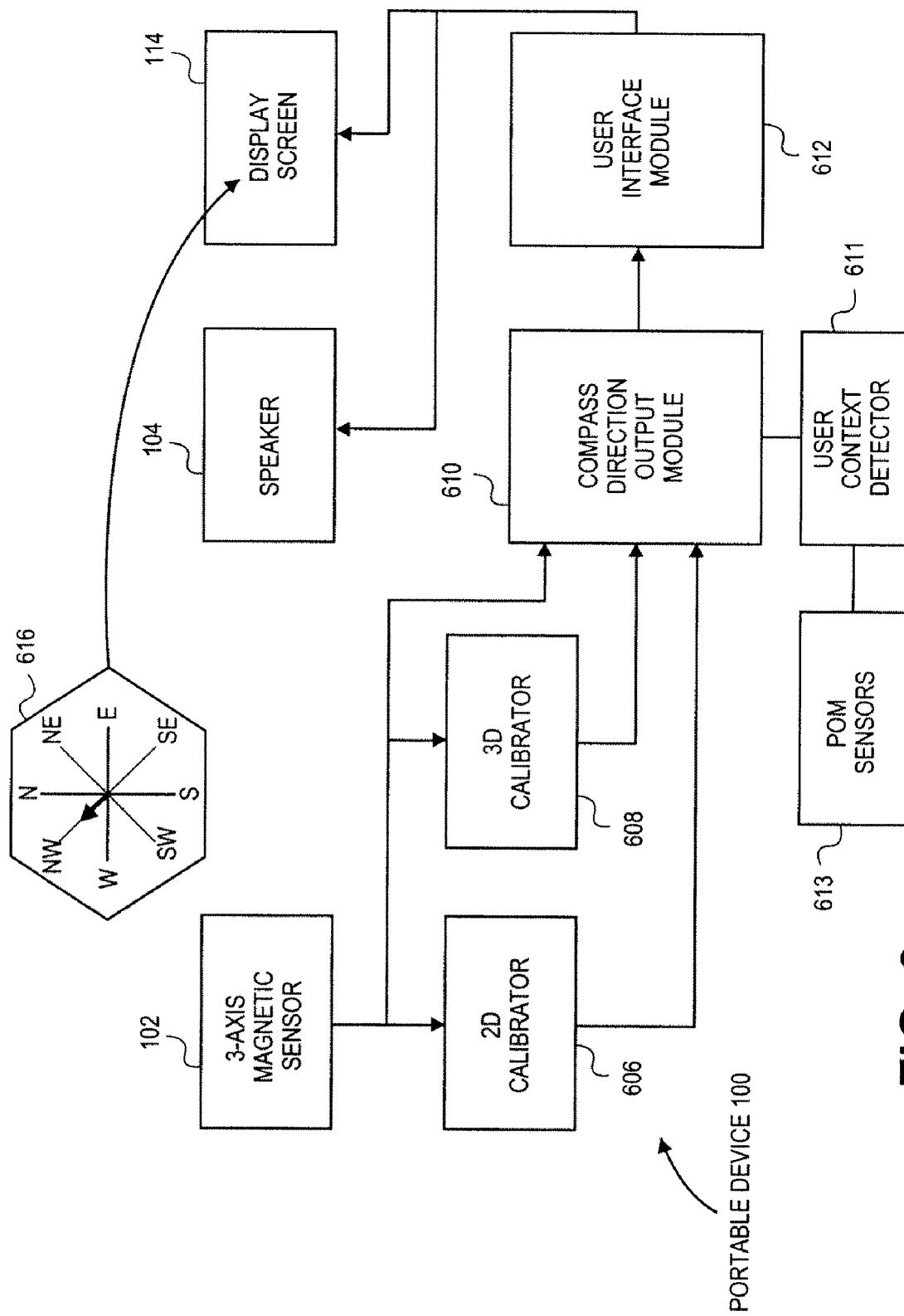
FIG. 6 is a block diagram of the portable device, showing certain functional components of the portable device relating to its compass function.

The above-described concept of having two different compass calibrators in the portable device 100 may be implemented as depicted in the block diagram of FIG. 6. This is a block diagram of the portable device 100 showing certain functional components that relate to the compass function. The device 100 has a 2D calibrator 606 and a 3D calibrator 608, both of which compute their respective offset fields based on magnetic field measurements produced by a 3-axis magnetic sensor 102. As explained above, the 2D calibrator 606 operates based on the assumption that its input magnetic field measurements define a generally circular path, while the 3D calibrator 608 expects its input measurements to define a generally spherical surface. To select between the two calibrators, a compass direction output module 610 is provided, to make the final decision on the direction output for the compass. The direction output may then be supplied to a user interface module 612 that presents the direction output to the user, e.g. in the form of a compass coordinate display on a display screen 614 of the portable device 100, or as a heading spoken through the speaker 104 using a speech synthesis function.

The direction output module 610 can make its selection depending upon how the portable device 100 is being carried by its user. For instance, a user interface function may be included in the module 610, to allow the user to manually select which type of calibration is to be performed for the compass. In another embodiment, the compass direction output module 610 is responsive to a user context detector 611. The latter is a mechanism that may infer how the portable device 100 is being carried by the user, using automatic detection (that is, without requiring specific input from the user).

The user context detector may be responsive to one or more of position, orientation and motion (POM) sensors 613 integrated in the device 100, which can sense changes in position, orientation or movement of the device 100. Such sensors may include an accelerometer, an inertial sensor, a gyroscopic sensor, a tilt sensor, a yaw sensor, and/or a pitch sensor. A POM sensor 613 may also include a radio frequency triangulation-based locating device, such as a global positioning system (GPS). A POM sensor 613 may be integrated in the portable device 100, and in particular may be mechanically fixed such that there is no relative movement between it and the magnetic sensor 102. As an example, a POM sensor may be in the physical form of an accelerometer chip that is installed on the same circuit board as an electronic compass chip (which contains a magnetometer circuit), where the circuit board is housed inside the device 100.

The raw data produced by the POM sensors 613 may be processed by the compass direction output module 610 and/or the user context detector 611, to detect, for instance, that the device 100 is undergoing sufficient rotation or tilting about the horizontal plane, such that the 3D calibrator 608 should be selected (instead of the 2D calibrator 606) to provide the direction output. In addition, this information may be used to determine that the device 100 has remained level for a sufficient period of time while moving (e.g., due to being attached to a car or boat), such that going forward, the 2D calibrator 606 should be selected to provide the direction output.

In another embodiment, the user context detector 611, based on having analyzed current, statistical POM sensor output data, in relation to previously learned and stored POM sensor data patterns, may infer that an automobile mode of use is currently present (where, for example, the device is fixed to a car that is being driven). Statistical techniques that may involve control system algorithms can be used in such analysis. For automobile mode, the compass direction output module 610 would select the geomagnetic field produced by the 2D calibrator 606 to be the direction output (and not the geomagnetic field produced by the 3D calibrator 608). In another scenario, if the user context detector 611 infers pedestrian mode (where the device may be held in the user's hand while the user is standing or walking), the compass direction output module 610 in that instance may decide to select the geomagnetic field produced by the 3D calibrator 608, and not the solution produced by the 2D calibrator 606.

Another technique for determining the user context (for purposes of selecting 2D or 3D calibration) is to monitor the measurements generated by the magnetic sensor 102 statistically, to determine whether or not the measurements are restricted to a circular path (e.g., ring) or whether their distribution is resulting in a generally spherical surface. Based on such analysis, the direction output module 610 can then infer that, for example, 2D calibration mode should be invoked (given that the magnetic field measurements are restricted to a circular path). Such a decision may then be validated by also monitoring the output of one or more of the POM sensors 613, to determine if the physical orientation of the device remains essentially level (suggesting that the 2D calibration mode should be maintained). The POM sensors 613 may continue to be monitored to detect when the portable device has left its plane or level orientation state, and has begun to tilt or rotate sufficiently about the horizontal plane in such a way that the 3D calibration mode should be invoked.

It should be noted that although FIG. 6 depicts both calibrator 606, 608 being present in the device 100, as a practical matter, it may be more desirable to deactivate the calibrator that has not been selected, in order to save computing and storage resources, as well as battery energy.

A machine-implemented method for operating the portable device 100 to provide the compass function may be described as follows (where the following operations need not be implemented in the order they are described):

measurement data is collected from the magnetic sensor, while the portable device is being carried by its end user (e.g., in a car or on foot), and without requiring the end user to deliberately rotate or position the device while the output data is being collected—this is a transparent or automatic calibration procedure;

measurement data is also collected from one or more POM sensors in the portable device (while the device is being carried by its end user and without requiring the end user to deliberately rotate or position the device while the output data is being collected); and the collected measurement data from one or both of the magnetic sensor and the POM sensor is processed, and in response either a 2D compass calibration process or a 3D compass calibration process is signaled to be performed upon the magnetic sensor.

The 2D compass calibration process may be performed, by solving for the unknown offset magnetic field vector, based on the collected measurement data from the magnetic sensor defining a generally circular path, not a sphere. In addition, the 2D calibration process allows for a solution of the unknown offset vector that can point to locations along a perpendicular center axis of the generally circular path that need not be at the center of the path.

In contrast, while the 3D compass calibration process may also be performed, by solving for the unknown offset magnetic field vector using similar algorithms, the collected measurement data in that case is presumed to define a generally spherical surface. The 3D calibration process may require a solution of the unknown offset vector that points to the center of the generally spherical surface.

On the other hand, statistical analysis of the collected measurement data from the POM sensor may also be performed, to determine whether or not the device is undergoing sufficient rotation or tilting about a horizontal plane—in that case, the 3D calibration process, and not the 2D process, is signaled in response.

The above-described functional components of the portable device 100 that are relevant to its compass function may be implemented in a variety of different ways. As is typical of current and future portable devices, the functionality therein is implemented using a combination of hardware, including hardwired circuitry, and software. In particular, the device 100 may have programmable circuitry that has been either previously configured by the manufacturer or executes a user downloadable program that is stored in the device 100, to perform many of the functions described above. Program storage may be implemented using one or more of various types of data storage media, e.g. fixed volatile or non-volatile solid state memory such as random access memory, removable non-volatile storage such as a flash memory card, and fixed mass storage such as an optical or magnetic rewritable disk drive. The storage may contain several program modules including, for instance, those that govern the functions of the calibrator 606, 608, as well as that of the compass direction output module 610, user interface module 612, and user context detector 611. The programmed processor may include any suitable combination of programmable logical processing circuitry typically available for portable devices, such as an applications processor that is integrated in a typical multifunction smart phone, a central processing unit (CPU) such as that which may be found in a dedicated portable digital camera or a laptop personal computer, and a dedicated microcontroller or digital signal processor (DSP) chip. Although not explicitly shown in the figures, the coupling between the different functional unit blocks is understood to include all necessary analog and/or digital circuitry for interfacing between different types of signaling and integrated circuit topologies. Finally, in most instances, all of the functionality depicted in FIG. 6 may be implemented using solid state and integrated circuit packages that are integrated within the housing of the portable device 100. Additional features of the portable device 100, such as a battery as the main rechargeable power source, communications interfaces for communicating with networks such as telephone networks and data networks, and physical or virtual user interfaces such as keypads and touch screens, have not been described for the sake of brevity.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIG. 6 depicts the two calibrators as being coupled to the same functional, 3-axis magnetic sensor 102, in practice the 3-axis magnetic sensor 102 could be implemented as two separate magnetic sensor chips or two separate magnetic sensor circuits on the same chip, each being dedicated to serve a respective one of the calibrators 606, 608. The description is thus to be regarded as illustrative instead of limiting.

What is claimed is:

1. A portable device comprising:
    a three axis magnetic sensor;
    a first compass calibrator to compute a first offset field based on a set of magnetic field measurements by the sensor that define a generally spherical surface, and to use the first offset field to compute a first geomagnetic direction;
    a second compass calibrator to compute a second offset field based on a set of magnetic field measurements by the sensor that define a generally circular path, and to use the second offset field to compute a second geomagnetic direction; and
    a compass direction output module that selects one of the first and second geomagnetic fields to be its direction output, based on data from a position, orientation or motion (POM) sensor, wherein the POM sensor is a different component than the three axis magnetic sensor.

2. The portable device of claim 1 further comprising:
    a user context detector to detect how the portable device is being carried by its user, wherein the compass direction output module is to select from amongst the first and second geomagnetic fields responsive to the user context detector.

3. The portable device of claim 2 wherein the user context detector, responsive to the POM sensor, is to indicate that the device has remained level for a period of time.

4. The portable device of claim 2 wherein the detector indicates automobile mode when the device is fixed to a car that is being driven,
    the compass direction output module to select the second geomagnetic field as its direction output and not the first geomagnetic field, when in automobile mode.

5. The portable device of claim 4 wherein the detector indicates pedestrian mode when the device is being held in the user's hand and the user is walking,
    the compass direction output module to select the first geomagnetic field and not the second, when in pedestrian mode.

6. The portable device of claim 2 wherein the detector indicates pedestrian mode when the device is being held in the user's hand and the user is walking,
    the compass direction output module to select the first geomagnetic field and not the second, when in pedestrian mode.

7. The portable device of claim 2 wherein the user context detector detects, responsive to the POM sensor, how the portable device is being carried by its user, and wherein the POM sensor is one of a GPS and an accelerometer.

8. The portable device of claim 7 wherein the POM sensor is an accelerometer, wherein the user context detector detects, responsive to the POM sensor and responsive to the three axis magnetic sensor, that the portable device is being carried by its user in an automobile mode or in a pedestrian mode, and wherein the second compass calibrator uses a 2D calibration to calibrate the magnetic sensor using the set of magnetic field measurements measured by the sensor that define a generally circular path and using the data from the POM sensor.

9. The portable device of claim 8 wherein the detection of how the portable device is being carried by its user, responsive to the three axis magnetic sensor, is validated by the user context detector, responsive to the POM sensor.

10. The portable device of claim 1, wherein the first compass calibrator is deactivated when the second compass calibrator computes the second offset field, and wherein the second compass calibrator is deactivated when the first compass calibrator computes the first offset field.

11. An article of manufacture, comprising:
    data storage having stored therein data that programs a processor to perform a calibration routine on an electronic compass that has a 3-axis magnetic sensor, to compute an interference field for the compass,
    wherein the calibration routine is to determine that the magnetic sensor has remained essentially level, in that it has not rotated about a horizontal plane, for at least a predetermined time interval while moving along the horizontal plane, based on data from a position, orientation or motion (POM) sensor, and in response select a 2D calibration process to be performed on the sensor for computing the interference field,
    and wherein the calibration routine is to determine that the sensor is sufficiently tilting or rotating about the horizontal plane, based on data from the position, orientation or motion (POM) sensor, and in response select a 3D calibration process to be performed on the sensor for computing the interference field, wherein the POM sensor is a different component than the three axis magnetic sensor.

12. The article of manufacture of claim 11 wherein the 2D calibration process accepts more than one solution for the interference field, wherein the acceptable solutions lie on and are spaced apart along the center axis of a geomagnetic measurement sphere, so long as the magnetic sensor is essentially staying in the horizontal plane while moving.

13. The article of manufacture of claim 12 wherein the 3D calibration process is to find a solution for the interference field that lies at the center of the geomagnetic measurement sphere.

14. The article of manufacture of claim 11, wherein the 2D calibration process is deactivated while the 3D calibration process is being performed, and the 3D calibration process is deactivated when the 2D calibration process is being performed.

15. A machine-implemented method for operating a portable device having a three-axis magnetic sensor to provide a compass function, the method comprising:
    collecting measurement data from the magnetic sensor in the portable device, while the device is being carried by its end user and without requiring the end user to deliberately rotate or position the device while the data is being collected;
    collecting measurement data from one or more position, orientation or movement (POM) sensors in the portable device, while the device is being carried by its end user and without requiring the end user to deliberately rotate or position the device while the data is being collected; and
    processing collected measurement data from both of the magnetic sensor and the POM sensor and in response signaling that one of a 2D compass calibration process and a 3D compass calibration process be performed upon the magnetic sensor, wherein the POM sensor is a different component than the three axis magnetic sensor.

16. The method of claim 15 further comprising:
    performing the 2D compass calibration process by solving for an unknown offset magnetic field vector based on the collected measurement data from the magnetic sensor, wherein the collected measurement data from the magnetic sensor define a generally circular path, not a sphere, and wherein the 2D calibration process allows for a solution of the unknown offset vector that can point to locations along a perpendicular center axis of the generally circular path that need not be at the center of the path.

17. The method of claim 15 further comprising:
performing the 3D compass calibration process by solving for the unknown offset magnetic field vector based on the collected measurement data from the magnetic sensor,
wherein the collected measurement data from the magnetic sensor define a generally spherical surface and
wherein the 3D calibration process requires a solution of the unknown offset vector that points to the center of the generally spherical surface.

18. The method of claim 15 wherein said processing collected measurement data comprises:
performing statistical analysis of the collected measurement data from the POM sensor to determine whether or not the device has remained essentially level, wherein the 2D calibration process, and not the 3D process, is signaled in response to having so determined.

19. The method of claim 15 wherein said processing collected measurement data comprises:
performing statistical analysis of the collected measurement data from the POM sensor to determine whether or not the device is undergoing sufficient rotation or tilting about a horizontal plane, wherein the 3D calibration process, and not the 2D process, is signaled in response to having so determined.

20. The method of claim 15 wherein the POM sensor is an accelerometer; and further comprising:
calibrating the magnetic sensor using a 2D calibration that uses data from both of the magnetic sensor and the POM sensor.

21. The method of claim 15, wherein the 2D calibration process is deactivated while the 3D calibration process is being performed, and the 3D calibration process is deactivated when the 2D calibration process is being performed.

22. A portable device comprising:
a three axis magnetic sensor;
a first compass calibrator to compute a first offset field based on a set of magnetic field measurements by the sensor that define a generally spherical surface, and to use the first offset field to compute a first geomagnetic direction;
a second compass calibrator to compute a second offset field based on a set of magnetic field measurements by the sensor that define a generally circular path, and to use the second offset field to compute a second geomagnetic direction;
a compass direction output module that selects one of the first and second geomagnetic fields to be its direction output; and
a user context detector to detect, responsive to a position, orientation or motion (POM) sensor, how the portable device is being carried by its user, wherein the compass direction output module is to select from amongst the first and second geomagnetic fields responsive to the user context detector, wherein the POM sensor is a different sensor than the three axis magnetic sensor.

23. The portable device of claim 22 wherein the POM sensor is an accelerometer chip that is installed on the same circuit board as the three axis magnetic sensor, and wherein the user context detector detects, responsive to the POM sensor and responsive to the three axis magnetic sensor, that the portable device is being carried by its user in an automobile mode or in a pedestrian mode, and wherein the second compass calibrator uses a 2D calibration to calibrate the magnetic sensor using the set of magnetic field measurements measured by the sensor that define a generally circular path and using the data from the POM sensor.

* * * * *